Patented Mar. 18, 1930

1,751,267

UNITED STATES PATENT OFFICE

ELTON R. DARLING, OF DECATUR, ILLINOIS, ASSIGNOR, BY MESNE ASSIGNMENTS, TO CORNSTALK PRODUCTS COMPANY, INC., OF NEW YORK, N. Y., A CORPORATION OF DELAWARE

NONFIBROUS CELLULOSE FLOUR AND PROCESS OF MAKING SAME

No Drawing. Application filed June 7, 1928. Serial No. 283,743.

This invention relates to a non-fibrous cellulose flour and the method of preparation thereof from cottonseed hulls, the said flour being suitable for edible purposes as well as commercial uses such as diabetic and obesity flours, baking powders, toilet powders, medicinal tablets, paint and enamel bases, pressed articles, absorbents for perfumes and essential oils, sachet powders, material used in the production of rayon and as a base for nitrated products, used in smokeless powder and collodion. Because of its freedom from starch and sugars this material is valuable in the preparation of diabetic and obesity flours.

In carrying out this invention, use is made of cotton seed hulls recovered from the fibre as disclosed in the co-pending patent application of Jackson and Darling Serial Number 280,646, filed May 25th, 1928.

In the said co-pending application the cotton seed hulls are treated by first being given a leaching with hot water to remove the dirt and water soluble materials and to cause a swelling of the hull materials by absorption so that they will open and allow the subsequent operations. In the said application there is also described a process of digesting the hulls to digestion under pressure with a heated solution of an alkali or preferably to a combined solution of an alkali or reducing salt. The hulls are preferably treated with an alkali, such as sodium hydroxide, to which there has been added sodium sulfite in the ratio of 9 parts of the former to one of the latter, the operation being carried on in a kier at pressures of from 10 to 30 pounds and the corresponding temperature of from 121 to 142° C., the time ranging from 3 to 6 pounds depending upon the pressure used, the higher pressure requiring less time. After this has been done the fibers are removed from the hulls by putting them through a pulp beater whereupon the pulp and fibers are mechanically separated by any known means.

The material and method herein described will serve as illustrative but not strictly limiting in its nature as there are several ways in which the method may be followed all of which are within the scope of the invention disclosed and claimed.

As a preferred method the cotton seed hulls are heated for one hour at ten pounds pressure in an oxidizing solution of such strength that materials, other than cellulose, are oxidized and are in a condition whereby their removal or extraction can take place in subsequent operations.

It has also been found that certain materials are also dissolved by the oxidizing media, and their removal is made possible by washing the material at the end of the stated time.

The one hour time period and the ten pounds pressure named above may be varied to meet different physical conditions and circumstances in preparing the product for the operations to follow.

Following the oxidizing operation, the material is well washed with water and then heated under pressure with caustic soda and sodium sulphite or salt of a sulphur acid other than sulphuric, whereby the materials which have been oxidized will be removed. The time of this treatment and the strength of these chemicals are such that the material will be cleaned and put in a condition to make the succeeding operations easy.

After the cleaning operation is completed the material is well washed and then bleached to a clean and permanent white by the use of any of the known bleaching agents, after which the material is again well washed and dried, the final result being a non-fibrous powder or flour with the qualities hereinbefore set forth.

I claim:

1. The process of preparing non-fibrous cellulose flour from cotton seed hulls which comprises heating said hulls for a predetermined time and at a predetermined pressure in an oxidation solution of such strength that the constituents of the said hulls other than cellulose are oxidized; washing the material with water at the end of the said time; thereupon heating the material under pressure with caustic soda and sodium sulphite whereby removal of the oxidized materials is effected; again washing the material; bleaching the material and washing and drying the same.

2. The method of preparation of a non-fibrous cellulose flour from cotton seed hulls consisting in the following steps; heating the hulls for a predetermined time and at a predetermined pressure to oxidize the constituents of the said hulls other than cellulose; washing the material with water at the end of the said predetermined time; removing the said oxidized materials by heating the mass under pressure with caustic soda and sodium sulphite; washing the mass; bleaching same to a permanent white; again washing the mass; and drying same.

3. The method of preparation of a non-fibrous cellulose flour from cotton seed hulls consisting in the following steps; heating the hulls for approximately sixty minutes and at approximately ten pounds pressure to oxidize the constituents of the said hulls other than cellulose; washing the material with water at the end of the said predetermined time; removing the said oxidized materials by heating the mass under pressure with caustic soda and sodium sulphite; washing the mass; bleaching same to a permanent white; again washing the mass; and drying same.

4. The method of preparation of a non-fibrous cellulose flour from cotton seed hulls consisting in the following steps: heating the hulls for a predetermined time to oxidize the constituents other than cellulose of the said hulls; washing the mass with water at the end of the said predetermined time; removing the said oxidized materials by heating the mass under pressure with caustic soda and sodium sulphite; washing the mass; bleaching same to a permanent white; again washing the mass; and drying same.

5. The method of preparation of a non-fibrous cellulose flour from cotton seed hulls consisting in the following steps: heating the hulls for a predetermined time to oxidize the constituents other than cellulose of the said hulls; washing the mass with water at the end of the said predetermined time; removing the said oxidized materials by heating the mass with caustic soda and sodium sulphite; washing the mass; bleaching same to a permanent white; again washing the mass; and drying same.

6. The method of preparation of a non-fibrous cellulose flour from cotton seed hulls consisting in the following steps: heating the hulls for approximately sixty minutes to oxidize the constituents of the said hulls other than cellulose; washing the material with water at the end of the said predetermined time; removing the said oxidized materials by heating the mass with caustic soda and sodium sulphite; washing the mass; bleaching same to a permanent white; again washing the mass; and drying same.

7. The method of preparation of a non-fibrous cellulose flour from cotton seed hulls consisting in the following steps; heating the hulls for a predetermined time and at a predetermined pressure to oxidize the constituents of the said hulls other than cellulose; washing the material with water at the end of the said predetermined time; removing the said oxidized materials by heating the mass under pressure with a sulphur acid salt other than sulphuric; washing the mass; bleaching same to a permanent white; again washing the mass; and drying same.

8. The method of preparation of a non-fibrous cellulose flour from cotton seed hulls consisting in the following steps; heating the hulls for a predetermined time to oxidize the constituents of the said hulls other than cellulose; washing the material with water at the end of the said predetermined time; removing the said oxidized materials by heating the mass with a sulphur acid salt other than sulphuric; washing the mass; bleaching same to a permanent white; again washing the mass, and drying same.

9. A non-fibrous cellulose flour prepared in accordance with claim 2 herein and characterized by its purity of color and the absence of all starches and sugars.

ELTON R. DARLING.